March 26, 1929.  C. R. LUMLEY  1,706,736
LUBRICATING DEVICE
Filed Nov. 1, 1926

INVENTOR
Charles R. Lumley
BY
Frank Warren
ATTORNEY

Patented Mar. 26, 1929.

1,706,736

UNITED STATES PATENT OFFICE.

CHARLES R. LUMLEY, OF SEATTLE, WASHINGTON, ASSIGNOR TO THE DERBY COMPANY, OF SEATTLE, WASHINGTON.

LUBRICATING DEVICE.

Application filed November 1, 1926. Serial No. 145,436.

My invention relates to improvements in lubricating devices that are adapted for use with internal combustion engines and the leading object of my invention is to provide a lubricating device that is adapted to be connected with a fuel inlet conduit of an internal combustion engine whereby a desired amount of oil may be drawn from the lubricating device into the combustion chamber of said engine by means of the suction of said engine thereby lubricating all the working parts therein.

Another object is to provide, in a lubricating device, means for automatically maintaining, at all times, a substantially constant oil level in the oil container of the lubricating device, thus causing the air that is forced to pass therethrough to travel through the same depth of oil to be carried to and deposited within the combustion chamber of the engine at all times.

Another object is to provide a lubricating device in which the supply of oil is automatically replenished in the container of the lubricating device from a source of supply as fast as the oil is drawn from such container.

Other and more specific objects will be apparent from the following description taken in connection with the accompanying drawings, wherein—

Figure 1:
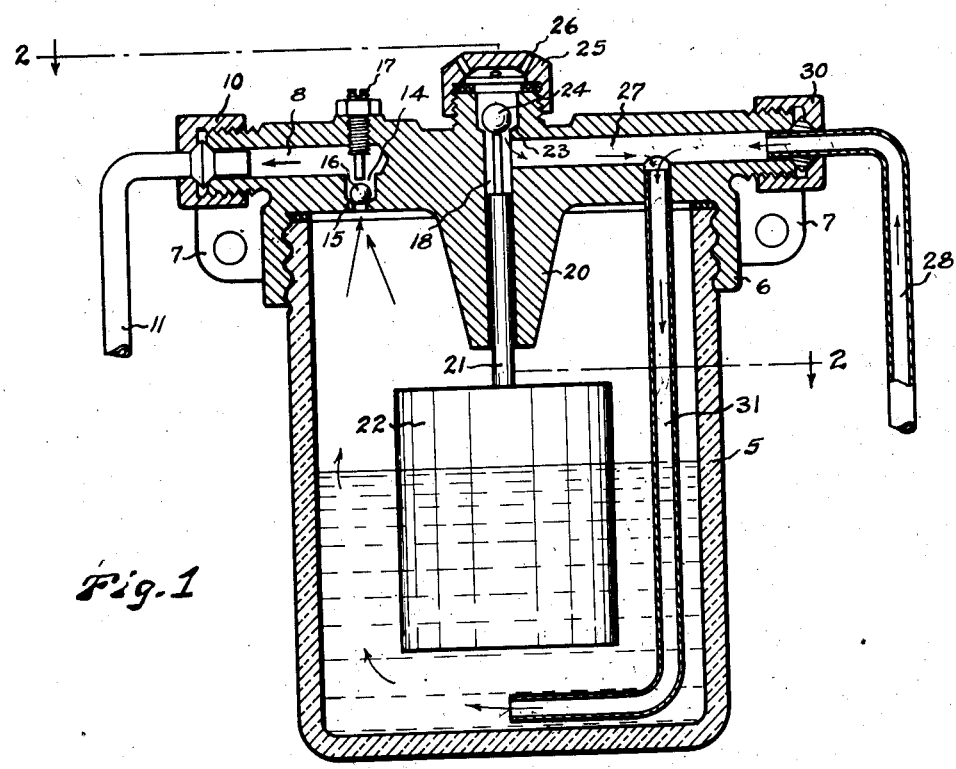
Figure 2:
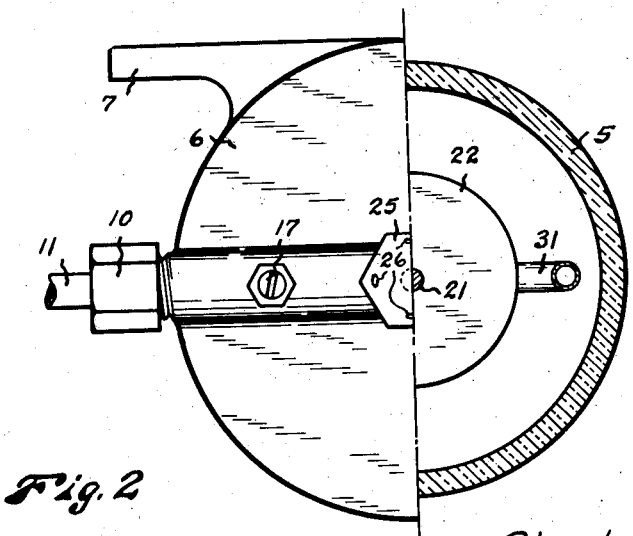

Fig. 1 is a vertical central section of a lubricating device in accordance with my invention, and Fig. 2 is a view partly in plan and partly in horizontal section substantially on broken line 2—2 of Fig. 1.

Referring to the drawings, throughout which like reference numerals designate like parts, 5 designates a receptacle, which may be of glass, and 6 designates a cover adapted to screw onto the top of the receptacle 5. The cover 6 is shown as provided with brackets 7 thereon by which it may be made fast to a support and said cover carries all of the operative parts of the lubricating device as hereinafter described. Other means than the brackets 7 may of course, be employed for detachably engaging the device as a whole with such support.

In this connection I would state that, while not so shown, the device is primarily intended for use in connection with the engines of automobiles, and when so used the device by reason of its small size and therefore necessarily containing but a comparatively small quantity of liquid lubricant can be advantageously housed beneath the hood of the engine or if desired can be secured upon the dash or instrument board of the automobile.

The cover 6 has a horizontal passageway 8 that is connected by a suitable fitting 10 with a vacuum or suction pipe 11 which is shown broken away but which leads to, and is connected with the fuel inlet pipe or manifold of an internal combustion engine in such a manner that the suction of the engine will be exerted through the pipe 11 when the engine is running. The passageway 8, near its inner end in the construction shown, is intersected by a vertical passageway 14, which extends through the cover member and communicates with the interior of the receptacle 5, and is provided near its lower end with a valve seat 15 for the reception of a ball check valve 16 that is retained in the passageway 14, by a screw 17 that is accessible for adjustment from the top of the cover plate. By the adjustment of this screw it is evident that the extent of movement of the ball valve away from its seat may be regulated whereby the passage of the required amount of oil laden air from the receptacle 5, as hereinafter described, may be very acurately controlled. By the construction shown, it will be seen that a predetermined quantity of oil laden air from the interior of the receptacle 5 may be drawn through the pipe 11 in the direction indicated by the arrows to the engine but that no air or gas can enter the container 5 from the passageway 8 on account of the check valve 16. The cover 6 is further provided with a vertical passageway 18, preferably centrally arranged, that extends downwardly through a guide boss carried by the cover and slidably receives a stem 21 on the upper end of a float 22. A valve seat 23 is provided in the upper end of the passageway 18 for the reception of a ball check valve 24. A cap 25 having air inlet perforations 26 therein is provided for the top end of the passageway 18. A horizontal passageway 27 in the cover 6 communicates with the vertical passageway 18 below the ball valve 24, the upper end portion of the float stem 21 being of reduced size to permit a free flow of air between the passageways 18 and 27. An oil inlet pipe 28 is connected with the outer end of the passageway 27 as by conventional fitting means 30, and leads to a source of supply of oil, as an oil receptacle or tank, not shown. An air tight tubular conduit 31 communicates with the passageway 27 and extends downwardly toward the center of the receptacle 5 in such a manner as to afford an opening, located near the bottom central part of said receptacle, through which oil and air may be delivered into said receptacle.

In operation the pipe 11 is connected with the fuel inlet manifold of an internal combustion engine and the pipe 28 is connected with a source of supply oil. When the engine is started the suction of said engine will produce a partial vacuum in the receptacle 5, the ball 24 will close on the seat 23 and oil will be drawn through the pipe 28 into the receptacle 5. As soon as the oil within the receptacle 5 lifts the float 22 high enough to cause the stem 21 to engage with and unseat the ball valve 24 air will be caused to enter through perforations 26, passageways 18 and 27 and tube 31 and will be discharged from the bottom end of said tube 31. This air will then pass upwardly through the oil and around the float 22 picking up or become laden with small particles of oil and finally being drawn through the pipe 11 into the cylinders of the engine to lubricate the valves and upper cylinder walls thereby reducing wear and increasing the efficiency of the engine.

When the oil in the receptacle 5 has reached a predetermined level and the float 22 has opened the valve 24 enough to relieve the vacuum, no more oil will be drawn in until the oil level is lowered slightly and the valve 24 has again closed, whereupon more oil will be drawn in, thus automatically keeping the level of the oil very nearly constant. Keeping the oil level substantially constant insures that the air will always be drawn through substantially the same depth of oil and for this reason will always pick up or become laden with substantially the same amount of oil, thus affording means for causing said air always to pick up and become laden with the exact amount of oil desired.

Drawing the oil into the receptacle 5 by suction or vacuum from a container also makes it possible to use a small receptacle or cup for this purpose and to carry the main supply of oil in a separate container which may be at a distance from the receptacle 5.

The foregoing description accompanying drawings clearly disclose a preferred embodiment of my invention but it will be understood that this disclosure is merely illustrative and that such changes may be made as are within the scope and spirit of the following claims.

What I claim is:

1. In a lubricating device, the combination with a receptacle for liquid lubricant, of a supply pipe communicating with the interior of said receptacle, a suction or vacuum pipe communicating with the interior of said receptacle above the normal level of the liquid therein, means comprising in part said supply pipe for admitting air to said receptacle below the surface of the liquid therein, whereby the flow of liquid to the receptacle through said supply pipe will be checked and such air will become laden with lubricant by passing through such liquid before being sucked out by said suction or vacuum pipe, and float controlled means for automatically cutting off such air supply to permit liquid to again flow to the receptacle through said supply pipe.

2. In a lubricating device, the combination with a receptacle for liquid lubricant, of a supply pipe communicating with the interior of said receptacle, a suction or vacuum pipe communicating with the interior of said receptacle above the normal level of the liquid therein, means comprising in part said supply pipe for admitting air to said receptacle below the surface of the liquid therein, whereby the flow of liquid to the receptacle through said supply pipe will be checked and such air will become laden with lubricant by passing through such liquid before being sucked out by said suction or vacuum pipe, and means in the receptacle operatively affected by the rising and falling of the liquid therein for automatically cutting off said air supply or the liquid from said liquid supply pipe.

3. In a lubricating device, the combination with a receptacle for liquid lubricant, of a conduit communicating at one end with the interior of said receptacle below the surface of the liquid therein and adapted to be connected at its other end with a source of lubricant supply, float controlled means connected with said conduit for admitting air into said receptacle below the surface of the liquid therein, and a vacuum conduit communicating with the interior of said receptacle above the surface of the liquid therein for conducting away air that has risen through the liquid in the receptacle and become laden with lubricant therefrom.

4. In a lubricating device the combination with a receptacle for liquid lubricant, of a conduit communicating at one end with the interior of said receptacle below the surface of the liquid therein, said conduit being adapted to be connected with a source of liquid supply and being also provided with means for admitting atmospheric air thereto, a suction or vacuum producing conduit communicating with the interior of said receptacle above the surface of the liquid therein for conducting away air that has risen through the liquid in the receptacle and become laden with lubricant therefrom, and means within the receptacel for automatically and itermittently admitting air to said first named conduit whereby the flow of liquid therethrough is checked.

5. In a lubricating device, a receptacle, a suction conduit connected with the upper end of said receptacle, air inlet conduit means connected with said receptacle for delivering air into the same near the bottom thereof, a check valve for opening and closing said air inlet conduit means, a float for opening said check valve, and a conduit connected with said air inlet conduit through which oil may be drawn into said receptacle by suction when said check valve is closed.

6. In a lubricating device, a receptacle, suction conduit means connected with the upper portion of said receptacle, a check valve in the upper portion of said receptacle for controlling the inlet of air, a conduit for delivering air from said check valve to a point near the bottom of said receptacle, a float governed by the oil level within said receptacle and arranged to open said check valve, and a conduit connecting the upper portion of said air conduit with a source of supply of oil whereby oil may be drawn into said receptacle when said air valve is closed.

7. In a lubricating device, a receptacle, a suction pipe for connecting the upper portion of said receptacle with the fuel inlet conduit of an internal combustion engine, means forming an air inlet conduit for taking in air at the upper end of said receptacle and delivering said air at a point near the bottom of said receptacle, a check valve in said air inlet conduit, a float carried by the oil in said receptacle, a stem on said float for opening said check valve as the oil level rises in said receptacle and permitting said check valve to close as said oil level is lowered, and suction operated oil supply means comprising in part said air inlet conduit arranged to deliver oil to said receptacle when said air check valve is closed.

8. In a lubricating device, a receptacle, suction conduit means connected with the upper portion of said receptacle, a check valve provided in said suction conduit means, an air inlet conduit for admitting air at the upper end of said receptacle and delivering said air at a point near the bottom of said receptacle, a check valve for shutting off the intake of air through said conduit, a float carried by the oil in said receptacle, means connected with said float for opening said check valve as the oil level in said receptacle rises and for permitting said check valve to close as said oil level is lowered, and oil supply means comprising in part said air inlet conduit arranged to deliver oil by suction to said receptacle when said air check valve is closed.

9. In a lubricating device, a receptacle, suction operated oil inlet means connected therewith, vacuum means connected with said receptacle, a float in said receptacle, air inlet means having an opening to the atmosphere at the upper end of said receptacle and extending around said float to a point near the bottom of said receptacle for delivering air below said float, and a valve in said air inlet means arranged to be operated by said float.

10. In a lubricating device, a receptacle, a suction conduit connected with the upper end of said receptacle, means forming a passageway at the top of said receptacle, a tube carried by said receptacle and communicating with said passageway and extending to a point near the bottom of said receptacle, air inlet means connected with said passageway, a check valve in said air inlet means, a float carried by the oil in said receptacle and arranged to control the opening and closing of said valve, and an oil inlet conduit connected with said passageway for admitting oil into said tube by suction when said air check valve is closed.

11. In a lubricating device, a receptacle, means forming a vertical air inlet conduit arranged centrally of said receptacle at the top thereof, a check valve in the upper end of said air inlet conduit, a float carried by the oil in said receptacle, a stem on said float slidable in said air inlet conduit and adapted to engage said check valve and open the same as the float is raised, means forming a passageway that communicates with said air inlet conduit below said check valve, a tube extending from said passageway downwardly to a point adjacent the bottom and center of said receptacle, and an oil inlet conduit connected with said passageway and adapted to admit oil into said tube.

In witness whereof, I hereunto subscribe my name this 21st day of October, A. D. 1926.

CHARLES R. LUMLEY.